United States Patent [19]

Schaffert

[11] Patent Number: 5,375,542
[45] Date of Patent: Dec. 27, 1994

[54] SEED COVERING APPARATUS

[76] Inventor: Paul E. Schaffert, R.R. 1, Box 157, Indianola, Nebr. 69034

[21] Appl. No.: 49,942

[22] Filed: Apr. 20, 1993

[51] Int. Cl.$^5$ ................................................ A01C 5/04
[52] U.S. Cl. ..................................... 111/192; 301/128; 111/190; 172/603; 172/747; 172/741
[58] Field of Search ............................. 111/190–196, 111/900; 172/741, 602–604, 747; 384/542, 585, 157; 301/9.2, 10.1, 14, 128; 411/389, 397, 384, 383

[56] References Cited

U.S. PATENT DOCUMENTS

| 816,543 | 3/1906 | Erb et al. | 172/604 |
| 2,204,490 | 6/1940 | Harris | 172/603 |
| 2,573,037 | 10/1951 | Lutes | 172/604 |
| 2,611,331 | 9/1952 | O'Neil | 111/192 |
| 2,685,478 | 8/1954 | Booth | 301/128 |
| 3,400,990 | 9/1968 | Sato | 384/542 |
| 3,614,861 | 10/1971 | Wickham et al. | 56/295 |
| 4,574,715 | 3/1986 | Dietrich, Sr. et al. | 111/192 |
| 4,633,791 | 1/1987 | Lindstrom et al. | 111/192 |
| 4,650,005 | 3/1987 | Tebben | 172/603 |
| 4,738,316 | 4/1988 | Wood | 172/603 |
| 4,762,075 | 8/1988 | Halford | 111/73 |
| 4,955,297 | 9/1990 | Tsukamoto . | |
| 5,025,736 | 6/1991 | Anderson . | |
| 5,159,887 | 11/1992 | Poll | 172/519 |

FOREIGN PATENT DOCUMENTS 66036  3/1942  Norway ........................ 301/128

OTHER PUBLICATIONS

White 6000 Series Planters Managing for Profit; publication date 1992.
Case International 900 Series Early Riser Cyclo ® Air Planters, Early Riser Planters; publication date unknown.
John Deere, MaxEmerge 2, Drawn, Integral and Unit Planters, publication date Aug. 1990.
7100 Max-Emerge ® Integral Planters, John Deere Operator's Manual, Plow & Planter Works OM-A45651 Issue F2, cover and pp. 1 and 145; publication date Jan. 1982.
7100 Max-Emerge ® Integral Planter, John Deere Plow & Planter Works PC-1468, cover and pp. 10-9 through 10-13, and pp. 110-39 through 110-41; publication date Jan. 1984.
7300 Vertical-Fold MaxEmerge ® 2 Planters, John Deere, Operator's Manual, John Deere Harvester Works OM-A51847 Issue F9, cover, table of contents and pp. 95-12 through 95-13; publication date May 1989.

Primary Examiner—Randolph A. Reese
Assistant Examiner—Spencer Warnick
Attorney, Agent, or Firm—John B. Phillips

[57] ABSTRACT

A seed covering apparatus for covering seeds with soil after an agricultural seed planter places the seeds within an open seed trench and before the planter closes the seed trench. The apparatus includes a disk with a center guide hole and a sealed bearing attached within the guide hole. An adjustable mounting assembly fixes the sealed bearing to the planter so that the disk can rotate about the bearing along one side of the seed trench. The mounting assembly orients the disk at an acute angle to the seed trench so that rotation of the disk along the side of the trench transfers soil from the side into the bottom of the seed trench. The transferred soil completely covers the seeds within the trench prior to closure of the trench by the planter.

8 Claims, 4 Drawing Sheets

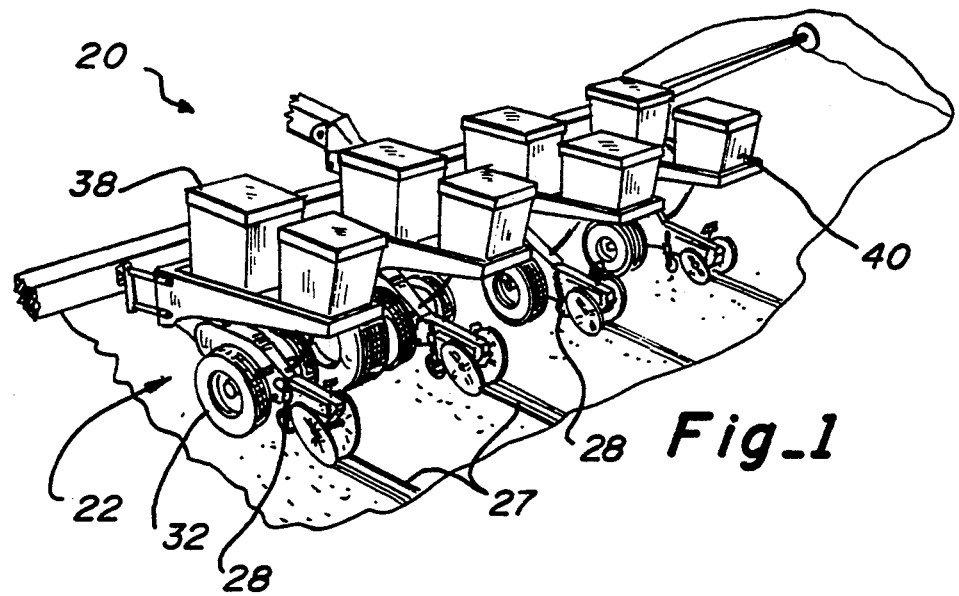
Fig_1
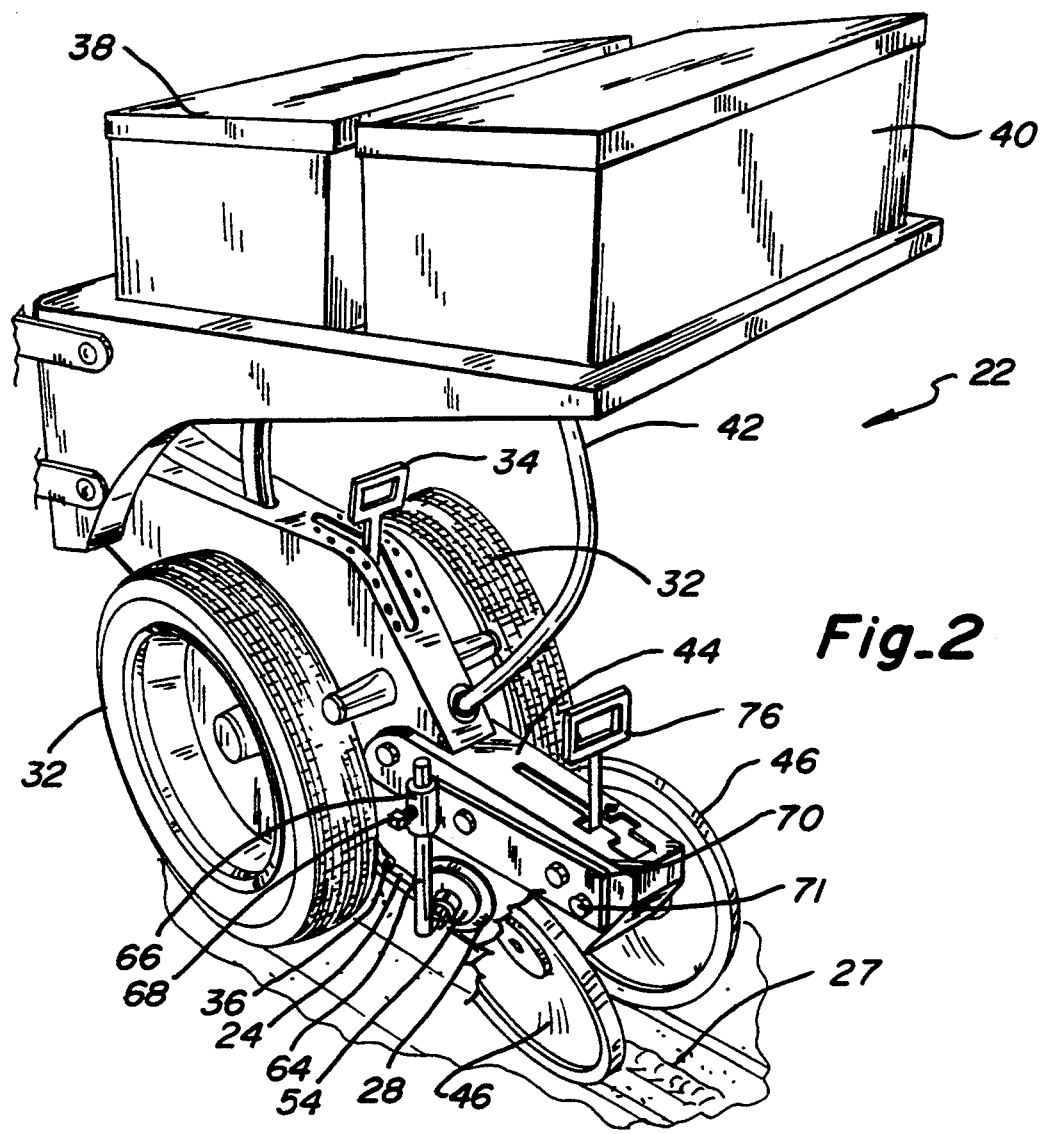
Fig_2

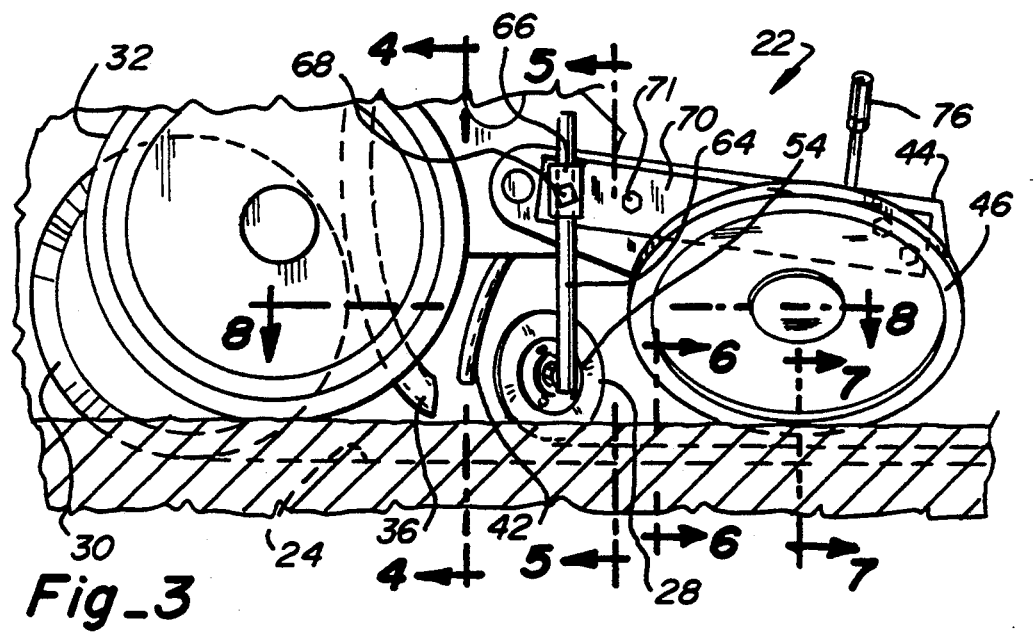
Fig_3
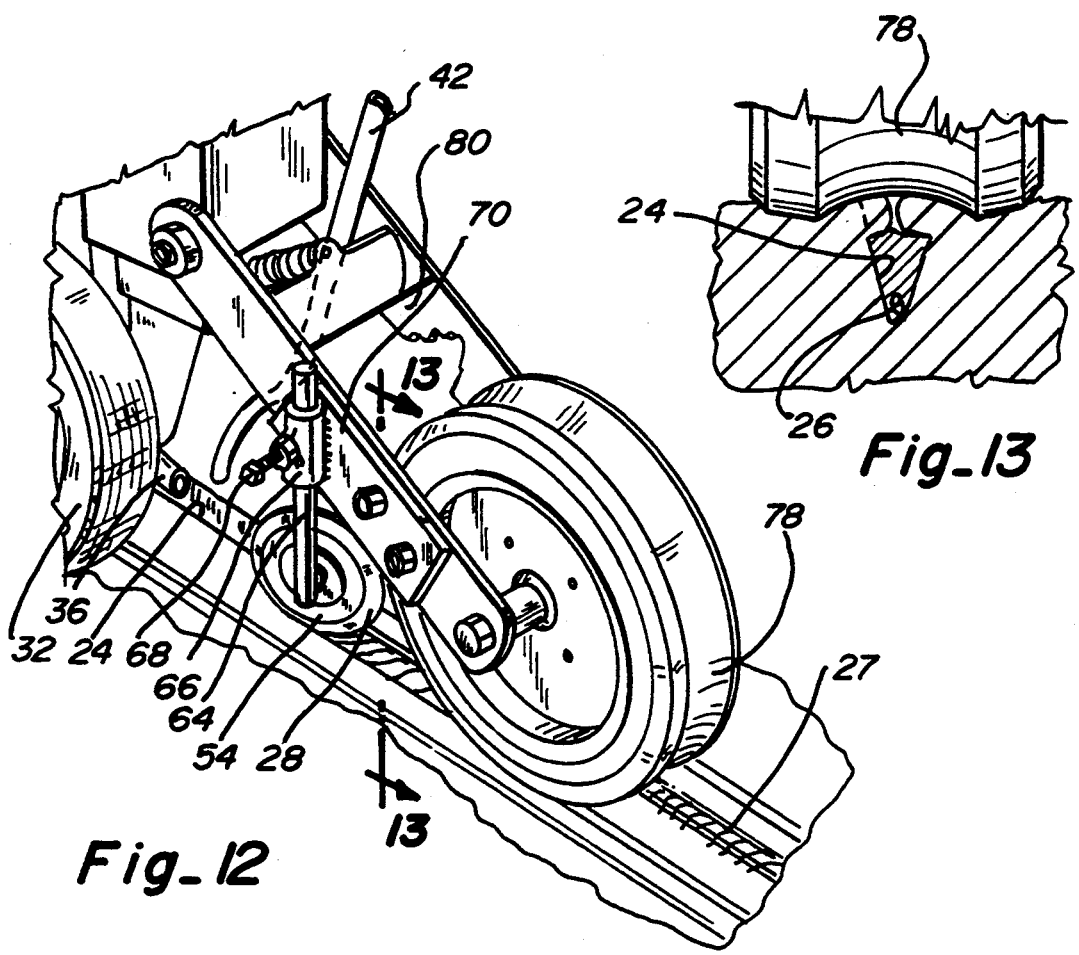
Fig_12
Fig_13

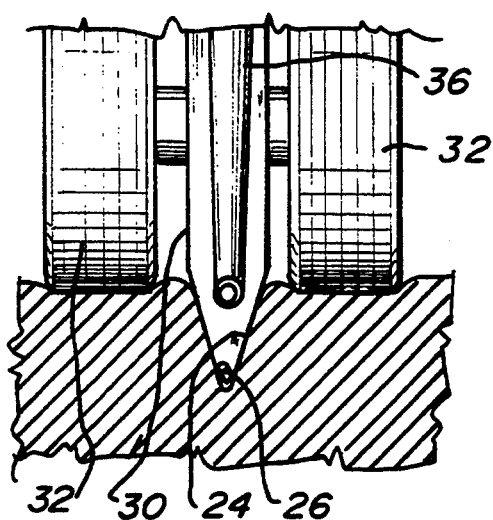
Fig_4
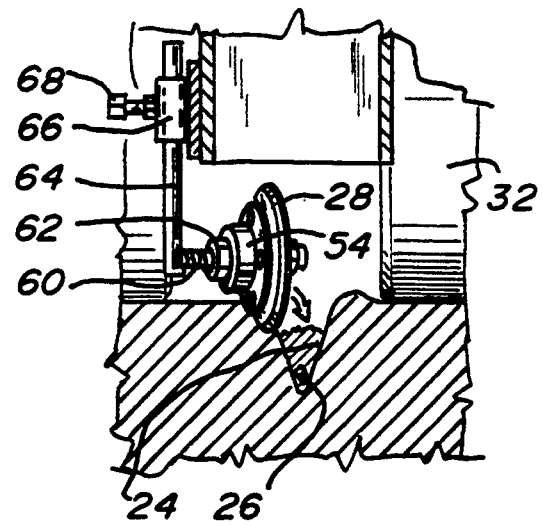
Fig_5
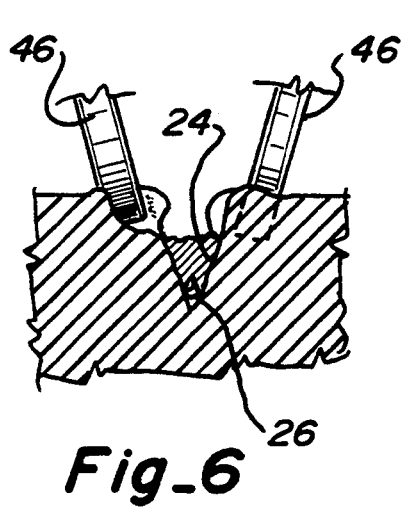
Fig_6
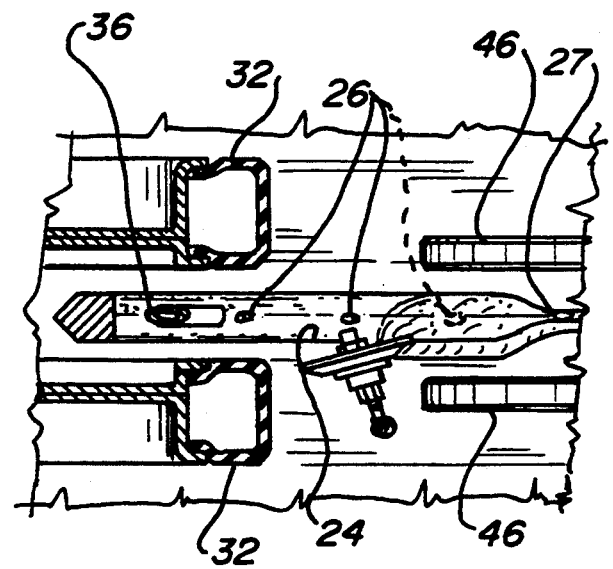
Fig_8
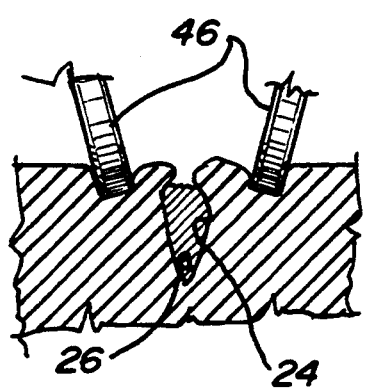
Fig_7

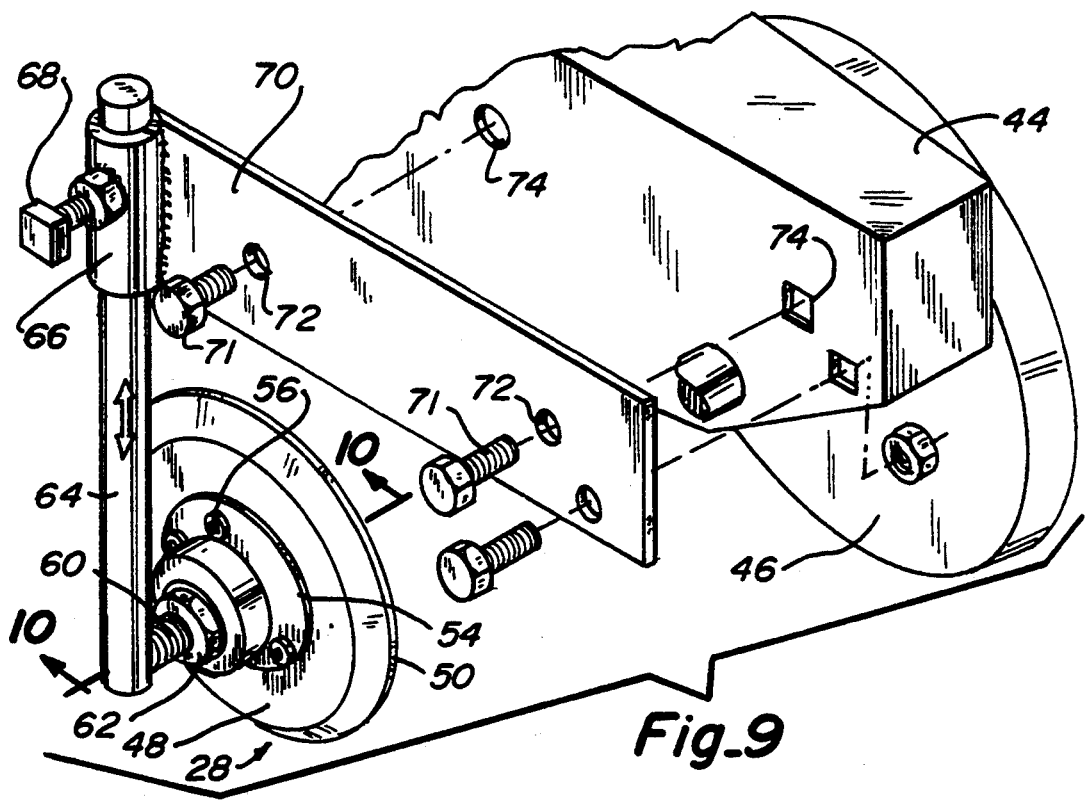
Fig_9
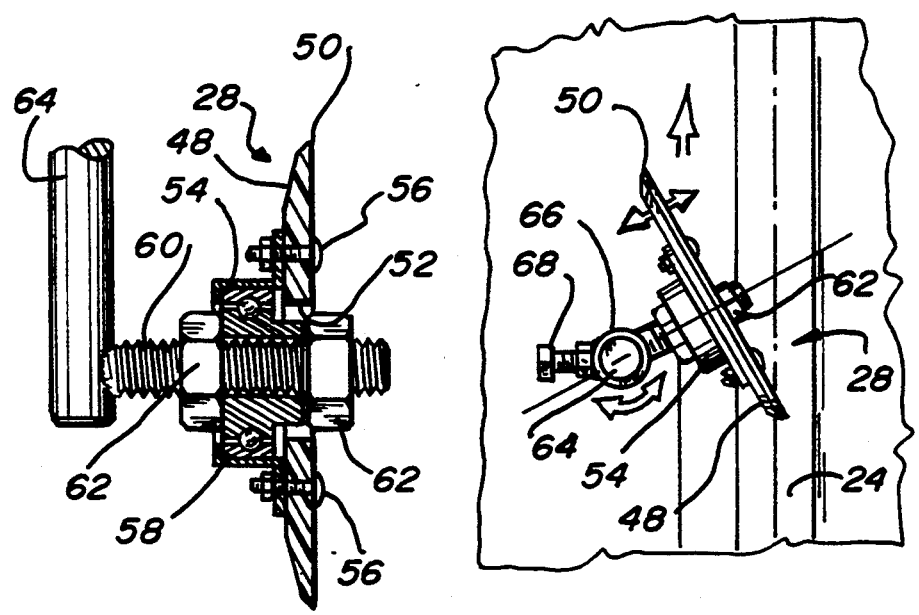
Fig_10  Fig_11

SEED COVERING APPARATUS

FIELD OF THE INVENTION

This invention relates to agricultural seed planters, and more particularly to seed planters which include apparatus adapted to cover seeds within a seed trench.

BACKGROUND OF THE INVENTION

Agricultural seed planting is typically accomplished by multi-row planters. Each planter row unit is adapted for opening a seed trench, depositing seeds within the seed trench, and closing the seed trench around the seeds. Additionally, many other attachments, such as chemical applicators, may be added to the row units.

The row units typically utilize closing wheels positioned at the trailing end of each row unit for closing the seed trench. These closing wheels squeeze soil from each side of the trench around the seed to close the seed trench. A spring loaded down pressure applied to the closing wheels may be variably adjusted to account for different soil conditions.

Closing the seed trench by compressing the sides of the trench frequently results in poor seed to soil contact which enables air pockets to remain in the seedbed. Such air pockets allow the plant to leaf out underground, thereby inhibiting emergence of the plant from the seedbed. Additionally, in dry conditions, it is not uncommon for the closed seed trench to crack open and expose the seeds contained therein. In either case, poor seed to soil contact may result in large numbers of lost plants.

Furthermore, when planting in heavy or moist soils, it is typically necessary to maximize the down pressure applied to the closing wheels to completely close the seed trench. The increased down pressure tends to compact the soil above the seed, thereby inhibiting the emergence of the plant. In moist or gumbo soils, the compacted soil above the germinating seed may dry out and form a hard crust layer which would further inhibit plant emergence. Should the closing wheels encounter light or sandy soils while set at maximum down pressure, the seeds at the bottom of the trench may be forced up into dryer soil adjacent the top of the seedbed. When the seed is positioned near the top of a dry seedbed, the seed is more likely to be lost to wind erosion. Even if the seed remains within the seedbed, it may germinate improperly due to a lack of moist soil.

The problems of soil compaction in heavy or moist soils, and poor seed to soil contact in all soil types, are inherent with agricultural planters which use closing wheels to compress the seed trench. These problems are magnified when different soil types are combined within a single field. Therefore, row unit attachments that may alleviate one type of problem in one type of soil may be ineffective against other types of problems or in other types of soil. For example, row leveler chains pulled behind the closing wheels may reduce the tendency of some soils to crust. However, leveler chains will not enhance seed to soil contact and are not typically used in moist soils or in combination with chemical applicators. Thus, the prior art does not teach any single solution to these problems that would be effective across the entire range of soil types and that would be compatible with all commonly used row unit attachments.

It is with regard to this background information that the improvements available from the present invention have evolved.

OBJECTS AND SUMMARY OF THE INVENTION

It is the principal object of the present invention to provide a new seed covering apparatus for use with an agricultural seed planter. A related object is to transfer soil into an open seed trench formed by the planter, to cover seeds placed within the seed trench, prior to closure of the trench by the planter.

Another object of the present invention is to provide a seed covering apparatus of the foregoing type which is effective in all soil types and which may be used with all known seed planter attachments.

Another object of the present invention is to provide a seed covering apparatus of the foregoing type which is sturdy and durable but which may be quickly and easily added to existing seed planters.

A further object of the present invention is to provide an improved method of forming a seedbed which enhances seed to soil contact and reduces the likelihood of soil compaction or crusting within the seedbed.

A further object of the present invention is to provide an improved method of forming a seedbed as described above which works with all soil types.

Other objects of the present invention will become apparent from the following description and accompanying drawings.

The present invention is embodied in a small, rugged disk having a beveled surface on a first side tapering to a sharp edge at the periphery of the disk. A sealed bearing attached within a center guide hole of the disk allows the disk to rotate about the bearing. The sealed bearing is fixed to a threaded horizontal shaft by jam nuts threadably attached to the horizontal shaft on opposite sides of the sealed bearing. In this manner, the disk is free to rotate about the horizontal shaft.

The horizontal shaft is fixed to the lower end of a vertical shaft. The vertical shaft, in turn, is slidably and rotatably secured within a cylindrical sleeve attached to a mounting plate. The mounting plate may be adapted for attachment to numerous existing agricultural seed planters. The planter has a trencher for creating a seed trench, a seed tube for placing seeds within the seed trench, and a closing device for closing the seed trench. The mounting plate attaches the disk between the seed tube and the closing device so that the second side of the disk forms an acute angle with respect to the seed trench along the direction of travel of the planter.

The disk is positioned adjacent one side wall of the seed trench so that movement of the planter causes the disk to engage the side wall and transfer soil from the side wall to the bottom of the trench. The disk transfers a sufficient amount of soil from the side wall of the trench to completely cover the seeds within the bottom of the trench. The disk thus reduces the workload of the closing device which need not compact the soil tightly in order to completely close the seed trench and cover the seeds.

A more complete appreciation of the present invention and its scope can be obtained from understanding the accompanying drawings, which are briefly summarized below, the following detailed description of a presently preferred embodiment of the invention, and the appended claims.

BRIEF DESCRIPTION OF THE DRAWINGS

FIG. 1 is a perspective view of a multi-row agricultural seed planter embodying the seed covering apparatus of the present invention.

FIG. 2 is an enlarged perspective view of a single row unit of the planter illustrated in FIG. 1, with parts broken away for clarity.

FIG. 3 is a partial elevation view of the single row unit illustrated in FIG. 2.

FIG. 4 is an enlarged section view taken substantially in the plane of line 4—4 on FIG. 3.

FIG. 5 is an enlarged section view taken substantially in the plane of line 5—5 on FIG. 3.

FIG. 6 is an enlarged section view taken substantially in the plane of line 6—6 on FIG. 3.

FIG. 7 is an enlarged section view taken substantially in the plane of line 7—7 on FIG. 3.

FIG. 8 is an enlarged section view taken substantially in the plane of line 8—8 on FIG. 3.

FIG. 9 is an exploded perspective view of the seed covering apparatus illustrated in FIGS. 1-3, showing the mounting of the seed covering apparatus to a tail section of the row unit.

FIG. 10 is a partial section view taken substantially in the plane of line 10—10 on FIG. 9.

FIG. 11 is a generalized schematic view illustrating the orientation of the seed covering apparatus relative to a seed trench.

FIG. 12 is a perspective view of a single row unit similar to FIG. 2, showing the seed covering apparatus of the present invention in conjunction with an alternative tail section and closing wheel FIG. 13 is an enlarged section view taken substantially in the plane of line 13—13 on FIG. 12.

DESCRIPTION OF THE PREFERRED EMBODIMENT

An agricultural planter 20, shown in FIG. 1, typically includes a number of planter row units 22. Each row unit 22 forms a seed trench 24, deposits seeds 26 evenly along the seed trench, and then closes the seed trench 24 to form a seedbed 27. The present invention is embodied in a seed covering disk 28, shown in FIGS. 1-3, which engages the side wall of the seed trench 24 and scrapes soil therefrom to cover the seeds 26 with a layer of soil prior to closure of the trench 24 by the row unit 22.

The seed trench 24 is formed by a trench opener attached at the leading edge of each row unit 22. Although numerous types of openers are known in the art, a double disk trench opener is shown in FIG. 3. The double disk opener includes two disk blades 30 rotatably mounted on the row unit 22 to form a V-shape at the point of seed placement. Support wheels 32 flank the disk blades 30 to support the row unit 22 and allow the disk blades 30 to mold a V-shaped seed trench 24 at a predetermined depth within the soil (FIGS. 3 and 4). An adjustment handle 34 is used to adjust the depth of the seed trench 24 by lowering or raising the disk blades 30 relative to the support wheels 32.

A seed tube 36 is positioned directly over the seed trench 24 to the rear of the double disk blades 30, as shown in FIGS. 2-4. A metering system (not shown) regulates the distribution of seeds 26 from a seed hopper 38 to the seed tube 36. Thus, the seeds 26 are evenly spaced along the seed trench 24. Similarly, a chemical hopper 40 and chemical tube 42 (FIGS. 2 and 3) may be used to introduce granular herbicides or insecticides into the seed trench 24.

The trench opening and seed distribution elements of the planter 20 are well known in the art. Additionally, the present invention necessarily acts upon the seed trench 24 at a point to the rear of the seed tube 36. Thus, further description of planter operations which occur prior to seed placement within the trench 24 are unnecessary to describe the present invention.

Once the seeds 26 have been positioned within the seed trench 24, the trench is closed to form a seedbed 27 which facilitates germination of the seeds 26. Closure of the seed trench 24 is typically accomplished by closing wheels rotatably attached to the frame of a tail section 44 of the row units 22.

The closing wheels 46 shown in FIGS. 1-8 are angular press wheels which tend to squeeze the sides of the seed trench 24 together to close the trench above the seeds 26, as shown in FIGS. 6-8. However, before the angular press wheels 46 act on the seed trench 24, the disk 28 of the present invention dislodges a predetermined amount of soil from one side of the seed trench and directs the soil into the trench where it covers the seeds 26 at the bottom of the trench, as shown in FIGS. 5-8.

The disk 28 preferably includes one beveled side 48 which tapers to a sharp edge 50 at the circumference of the disk 28 (FIGS. 9 and 10). The beveled side 48 adds thickness and thus strength to the disk 28, while the sharp edge 50 facilitates movement of the disk 28 through the soil adjacent the seed trench 24. The disk 28 is formed with a center opening 52. A round collar 54 attached to the beveled side 48 of the disk 28 by bolts 56 retains and centers a sealed bearing 58 within the center opening 52. The internal diameter of the sealed bearing 58 is substantially equal to the external diameter of a threaded horizontal shaft 60 which is inserted through the sealed bearing. Jam nuts 62 are tightened against opposite ends of the sealed bearing 58 to fix the position of the bearing and disk 28 on the horizontal shaft 60. The horizontal shaft 60, in turn, is fixed to a bottom end of a vertical shaft 64. A top end of the vertical shaft 64 is retained within a cylindrical sleeve 66 by a set screw 68. The cylindrical sleeve 66 is attached in a conventional manner, as by a weld, to a mounting plate 70. Finally, bolts 71 attach the mounting plate 70 to the tail section 44 by matching holes 72 within the mounting plate to preexisting holes 74 located on the tail section 44.

Connected to the tail section 44 in this manner, the horizontal, vertical and rotational orientation of the disk 28 relative to the seed trench 24 may be predetermined and subsequently adjusted with ease. First, movement of the jam nuts 62 allows the disk 28 to be positioned a predetermined lateral distance from the center of the seed trench 24. Second, vertical movement of the vertical shaft 64 within the cylindrical sleeve 66 allows the disk 28 to penetrate the soil to a predetermined depth. Lastly, rotation of the vertical shaft 64 within the sleeve 66 allows the disk 28 to be set at a predetermined pitch angle relative to the seed trench 24.

When positioned as shown in FIGS. 3, 5, 8 and 11, the disk 28 rotates or rolls along the side of the seed trench 24 and scrapes a relatively thin layer of soil from one side of the seed trench. Due to the pitch angle of the disk 28 relative to the seed trench 24, the soil is directed into the seed trench where it covers the seeds 26 prior to closure of the trench by the angular press wheels 46.

Covering the seeds 26 with a layer of soil improves seed to soil contact upon closure of the seed trench 24. Additionally, the potential for air pocket formation within the seedbed 27 is substantially eliminated by use of the seed covering disk 28. Furthermore, as explained further below, by covering the seeds within the trench, the disk 28 reduces the work that must be done by the closing wheels to close the trench. This results in a more loosely packed seedbed 27 that enhances plant emergence.

Prior to the advent of the seed covering disk 28, closing wheels were typically required to exert great amounts of down pressure to ensure complete closure of the seed trench 24. The amount of down pressure applied to the closing wheels may be varied via an adjustment handle 76. However, the seed covering disk 28 of the present invention partially fills the seed trench 24 with soil, thereby reducing the workload of the closing wheels. Thus, the spring down pressure applied to the closing wheels may be reduced, thereby reducing soil compaction and crusting in the seedbed 27.

Due to the wide variety of soil conditions and tillage methods that may be encountered, agricultural seed planters 20 typically include a variety closing wheels that may be interchanged and used in different soil conditions. For example, the angular press wheels 46 are typically used in heavier soils or where planting is conducted under no-till conditions. Although the angular press wheels 46 are normally formed from rubber, cast iron angular press wheels may be used in extremely hard soils or where heavy crop residue is present. Alternatively, with soft soils or highly tilled areas, a single press wheel 78 may be used in place of the dual angular press wheels 46, as shown in FIG. 12.

The single press wheel 78 performs comparably to the dual angular press wheels 46 in soft soils, compressing the sides of the seed trench 24 together to close the trench. However, the single press wheel is subject to similar problems of inadequate seed to soil contact when it is not used with the seed covering disk 28. As explained above in conjunction with the angular press wheels 46, the disk 28 attaches to the alternative tail section 80 ahead of the single press wheel 78 and covers the seeds 26 before the single press wheel closes the trench (FIG. 13).

Only the mounting plate 70 and holes 72 need be altered to attach the disk 28 to different row unit tail sections. Thus, it should be understood that the seed covering disk 28 may be attached to all varieties and combinations of dual and single press wheels. For example, in moderate soils, a combination of a single press wheel and a pair of relatively small dual press wheels may be used to close the seed trench. Once a mounting plate 70 is constructed to attach the disk 28 to the particular row unit tail section, even such a hybrid assembly of closing wheels may benefit from the improved seed to soil contact and reduced down pressure offered by the disk 28.

Significant increases in plant populations may be achieved by adding the seed covering disk 28 to existing agricultural seed planters. Regardless of the effectiveness of any existing closing wheel system, the disk 28 will enhance seed to soil contact while reducing the workload of the closing wheels. Thus, the disk 28 reduces the chances of seedbed air pockets or opening seedbeds while simultaneously alleviating soil compaction and soil crusting. Furthermore, the disk 28 is preferably formed from a high density polymer to prevent the disk from becoming clogged in mud or moist soils as it rotates along the seed trench 24. Aside from its self-cleaning tendencies, other advantages of the polymer disk 28 include its immunity from rust as well as its resistance to herbicides, insecticides and fertilizers which may be applied during planting. While preferably formed from a high density polymer, the disk 28 may alternatively be formed from a metal alloy when planting operations are conducted in a rocky soil. Although a metal disk is not preferred for most soil types due to its tendency to clog and rust, a metal seed covering disk 28 will function adequately in rocky soil and is less susceptible to damage from rocks within the soil. Thus, the disk 28 is effective in all soil types and may be used with all existing planter row unit attachments.

A presently preferred embodiment of the present invention and many of its improvements have been described with a degree of particularity. This description has been made by way of preferred example and is based on a present understanding of knowledge available regarding the invention. It should be understood, however, that the scope of the present invention is defined by following claims, and not necessarily by the detailed description of the preferred embodiment.

The Invention claimed is:

1. A seed covering apparatus for use with a seed planter having a trencher for creating a seed trench, a seed tube for placing seeds within said seed trench, and a closing device for closing said seed trench, said seed covering apparatus comprising, in combination, a disk having a first side and a second side, means defining a guide hole at the center of said disk, said first side of said disk having a beveled surface tapering to a sharp edge at the periphery thereof, a sealed bearing, a collar securing said sealed bearing to said disk in alignment with said guide hole therein, a mounting plate adapted for attachment to said planter between said seed tube and said closing device, a cylindrical sleeve secured to said mounting plate, said cylindrical sleeve aligned vertically on said mounting plate, a vertical shaft retained within said cylindrical sleeve and adjustable to regulate vertical and rotational position of said vertical shaft within said sleeve, a threaded horizontal shaft fixed to the depending end of said vertical shaft for mounting said sealed bearing, nuts threadably attached to said horizontal shaft on opposite sides of said sealed bearing for securing said sealed bearing on said horizontal shaft whereby said disk rotates about said horizontal shaft, said vertical shaft being positioned in said sleeve to orient said second side of said disk at an acute angle with respect to said seed trench along the direction of travel of said planter whereby said disk engages a side wall of said trench to transfer soil from said side wall of said trench to the bottom of said seed trench for covering said seeds in front of said closing device.

2. A seed covering apparatus as defined in claim 1, wherein said disk is formed substantially from a polymer material having a high density.

3. A seed covering apparatus for use with a seed planter having a trencher for creating a seed trench, a seed tube for placing seeds Within said seed trench, and a closing device for closing said seed trench, said seed covering apparatus comprising, in combination, a disk having a guide hole at a center of said disk, a bearing secured to said disk in alignment with said guide hole therein, a vertical shaft adjustably attached to said planter for longitudinal movement along a vertical axis passing through the length of the vertical shaft and rotational movement about said vertical axis, said vertical shaft aligned vertically on said planter between said seed tube and said closing device, a threaded horizontal shaft fixed to a depending end of said vertical shaft for mounting said bearing, nuts threadably attached to said horizontal shaft on opposite sides of said bearing for securing said bearing on said horizontal shaft whereby said disk rotates about said horizontal shaft, said vertical shaft positioned to orient said disk at an acute angle with respect to said seed trench along the direction of travel of said planter whereby said disk engages a side wall of said trench to transfer soil from said side wall of said trench to a bottom of said seed trench for covering said seeds in front of said closing device.

4. A seed covering apparatus as defined in claim 3, wherein said disk is formed substantially from a polymer material.

5. A seed covering apparatus as defined in claim 4, wherein said disk has a first side and a second side, said first side of said disk having a beveled surface tapering to a sharp edge at a periphery thereof.

6. A seed covering apparatus for use with a seed planter having a trencher for creating a seed trench, a seed tube for placing seeds within said seed trench, and a closing device for closing said seed trench, said seed covering apparatus comprising, in combination, a disk having a guide hole at a center of said disk, a bearing secured to said disk in alignment with said guide hole therein, a threaded horizontal shaft for mounting said bearing, nuts threadably attached to said horizontal shaft on opposite sides of said bearing for securing said bearing on said horizontal shaft whereby said disk rotates about said horizontal shaft, means for adjustably attaching said horizontal shaft to said planter between said seed tube and said closing device and orienting said disk at an acute angle with respect to said seed trench along the direction of travel of said planter whereby said disk engages a side wall of said trench to transfer soil from said side wall of said trench to a bottom of said seed trench for covering said seeds in front of said closing device.

7. A seed covering apparatus as defined in claim 6, wherein said disk is formed substantially from a polymer material.

8. A seed covering apparatus as defined in claim 7, wherein said disk has a first side and a second side, said first side of said disk having a beveled surface tapering to a sharp edge at a periphery thereof.

* * * * *